United States Patent [19]
Hayakawa

[11] Patent Number: 4,458,557
[45] Date of Patent: Jul. 10, 1984

[54] FOUR-WHEEL DRIVE TRANSFER APPARATUS FOR AUTOMOBILE'S AUTOMATIC TRANSMISSION

[75] Inventor: Yoichi Hayakawa, Toyoake, Japan

[73] Assignee: Aisin-Warner Kabushiki Kaisha, Aichi, Japan

[21] Appl. No.: 183,169

[22] Filed: Sep. 2, 1980

[30] Foreign Application Priority Data

Sep. 6, 1979 [JP] Japan ................................ 54-114852
Sep. 6, 1979 [JP] Japan ................................ 54-114853

[51] Int. Cl.³ .......................................... F16H 37/06
[52] U.S. Cl. ................................. 74/665 GE; 74/674;
74/705; 180/247; 180/233
[58] Field of Search ..................... 74/674, 781 R, 783,
74/665 F, 665 G, 665 GD, 665 GE, 705, 740,
13, 15.6, 15.82, 15.84, 15.88; 180/247, 233

[56] References Cited
U.S. PATENT DOCUMENTS

| | | | |
|---|---|---|---|
| 874,580 | 12/1907 | Farkas et al. | 74/781 R |
| 2,314,833 | 3/1943 | Keese | 180/247 |
| 2,437,517 | 3/1948 | Greenlee | 74/781 R |
| 2,510,469 | 6/1950 | Greenlee | 74/781 R |
| 3,296,895 | 1/1967 | Karlsson | 74/15.88 |
| 4,103,753 | 8/1978 | Holdeman | 180/247 |
| 4,173,269 | 11/1979 | Craig | 192/113 B |
| 4,292,860 | 10/1981 | Kako et al. | 180/247 |

FOREIGN PATENT DOCUMENTS 747762 3/1944 Fed. Rep. of Germany ...... 180/247

Primary Examiner—Allan D. Herrmann
Assistant Examiner—D. Wright
Attorney, Agent, or Firm—Oblon, Fisher, Spivak, McClelland & Maier

[57] ABSTRACT

In the four-wheel drive transfer apparatus for the automotive vehicle's automatic transmission which includes input shaft, a first output shaft coaxially aligned with the input shaft and normally having a power transmission from the input shaft, and a second output shaft in parallel with the first output shaft and having a power transmission from the input shaft when the four-wheel drive is selected, the improvement further includes a wet-type multiple-disc clutch member, a wet-type multiple-disc brake member, and a planetary gear set interposed between the input shaft and the first and second output shafts and containing gearing elements selectively operated by the clutch member and brake member so that the gearing elements engage with or disengage from each other, whereby the clutch member causes the input shaft and the second output shaft to engage with each other so as to switch between the two-wheel drive and four-wheel drive during the vehicle running conditions and enable the transfer apparatus to provide gearshifts.

2 Claims, 3 Drawing Figures

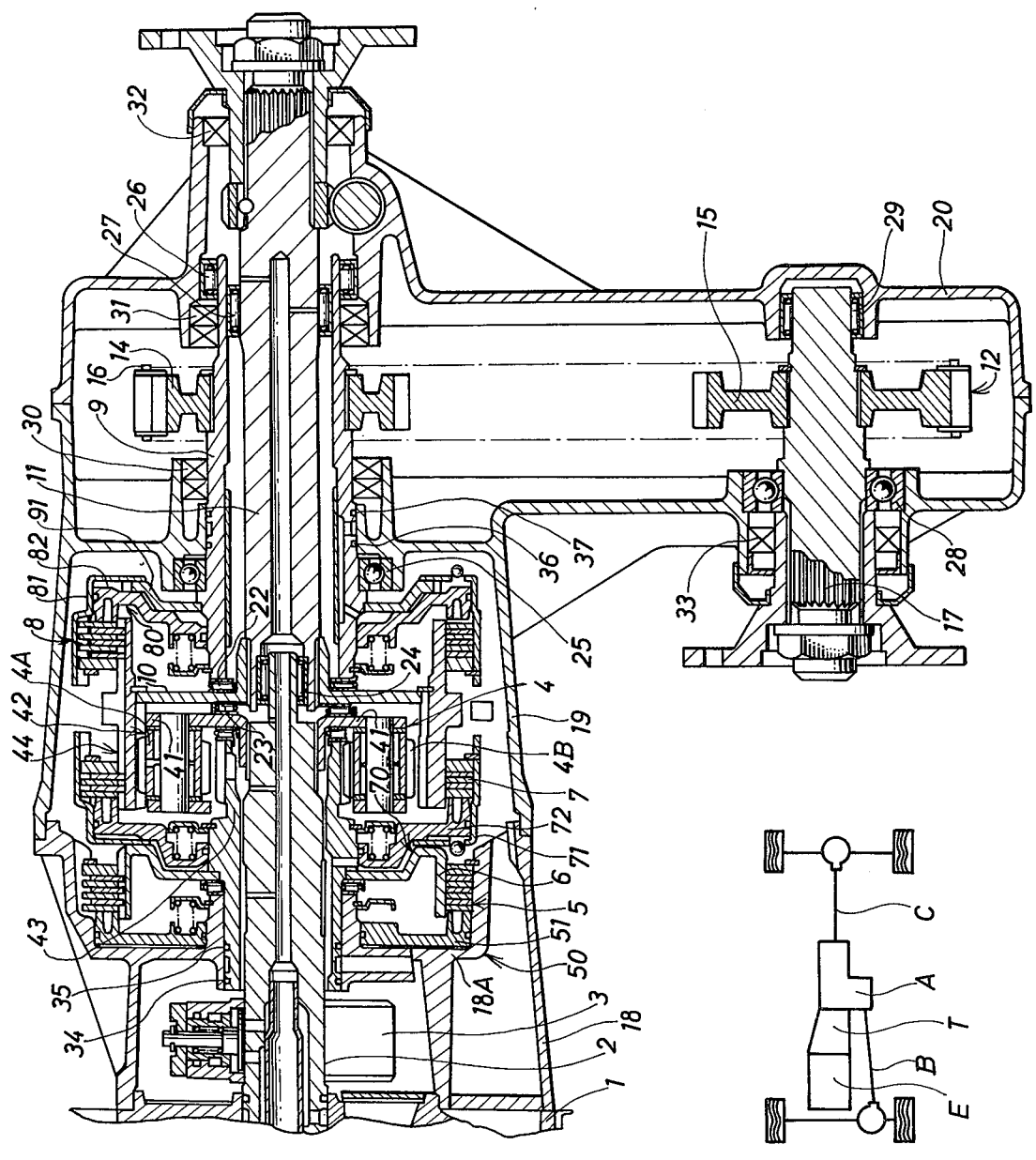

FOUR-WHEEL DRIVE TRANSFER APPARATUS FOR AUTOMOBILE'S AUTOMATIC TRANSMISSION

BACKGROUND OF THE INVENTION

1. Field of the Invention

The present invention relates to a transfer apparatus for four-wheel driven vehicles which is to be mounted on the automatic transmission and permits a change from the four-wheel drive to two-wheel drive or vice versa, and provides gear shifting functions.

2. Description of the Prior Art

There is known the transfer apparatus of the type disclosed herein, which provides the switching functions for changing from the four-wheel drive to two-wheel drive or vice versa. However, the prior art transfer apparatus has problems since it does not provide any proper switching function when the vehicle is running at high speeds. There is known no transfer apparatus that provides gearshifts combined with the switching functions.

SUMMARY OF THE INVENTION

In light of the problems of the prior art transfer apparatus, it is therefore an object of the present invention to provide a transfer apparatus which is capable of switching between the four-wheel drive and two-wheel drive for the four-wheel driven vehicle when it is cruising at high speeds and also provides gear shifting functions.

BRIEF DESCRIPTION OF THE DRAWINGS

Other objects and features will become apparent from the description which follows hereinafter by reference to the preferred embodiment shown in the accompanying drawings, in which:

FIG. 2 is a schematic diagram showing the outline of the power transmission system in an automotive vehicle; and FIG. 3 is a sectional view of the transfer apparatus in another embodied form of the present invention.

DETAILS OF THE PREFERRED EMBODIMENTS

Figure 1:
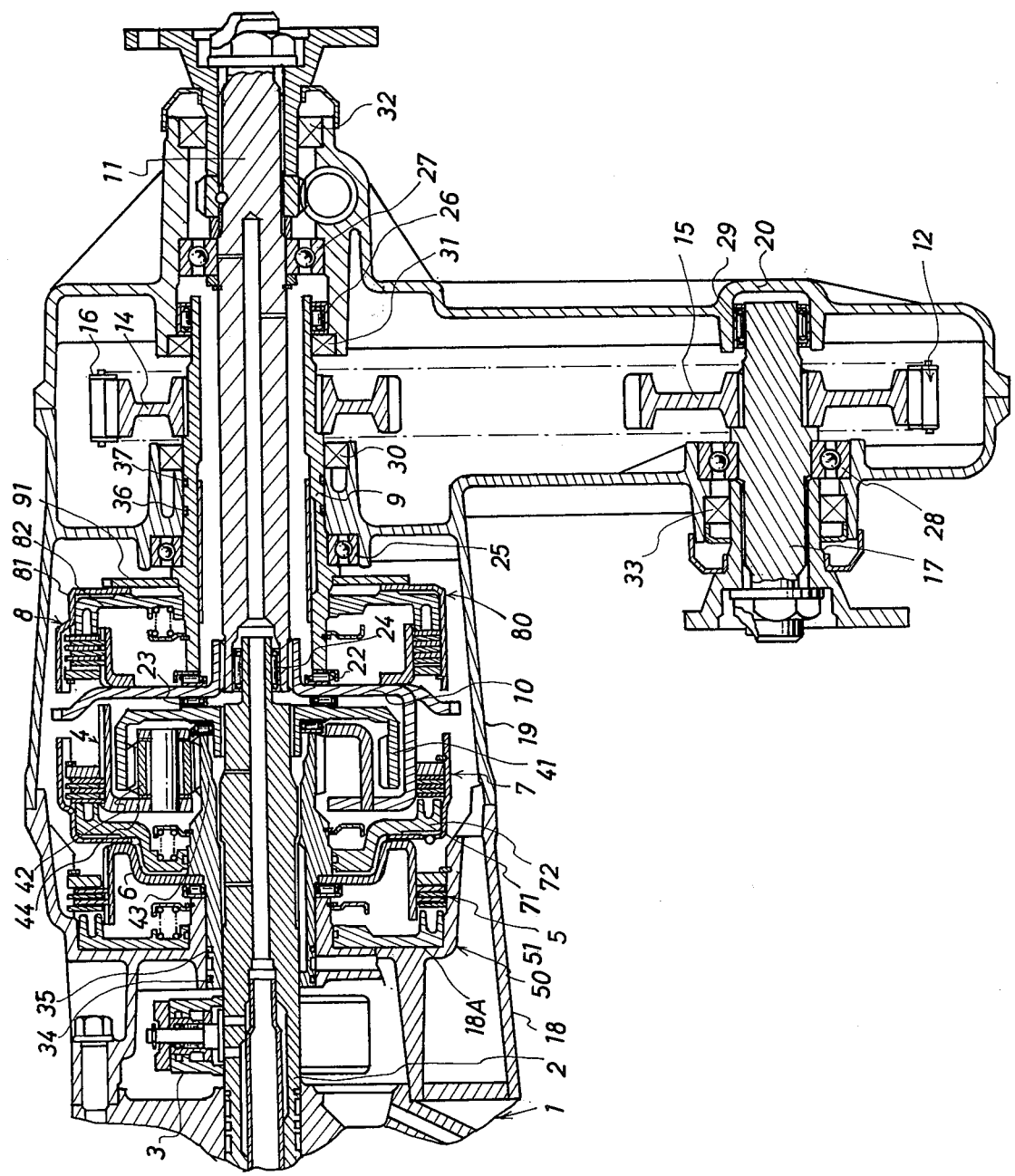
FIG. 1 is a sectional view illustrating the arrangement of the transfer apparatus in one embodied form of the present invention.

One preferred embodiment of the present invention is described by referring to FIG. 1. Reference numeral 1 designates a gear shifting device in the automatic transmission. A shaft designated by 2 provides both an output shaft for the gear shifting device 1 and an input shaft for the transfer apparatus. A governor valve 3 is mounted on the output shaft 2. A planetary gear set is generally designated by 4 and includes a ring gear 41 splined to the output shaft 2, a pinion 42 in mesh with the ring gear 41, a central or sun gear 43 in mesh with the pinion 42, and a revolving carrier 44 rotatably supporting the pinion 42 and being splined to one 11 of the output shafts of the transfer apparatus by way of a hub 10. Reference numeral 5 designates a friction brake which is operated to engage with a front transfer case 18 braking the sun gear. A hydraulic power or servo-operated cylinder assembly 50 includes a cylinder 18A formed in the front transfer case 18 and a piston reciprocatably mounted within the cylinder 18A. A friction clutch assembly is designated by 7 and is actuated by a hydraulic power or servo operated cylinder 70 which consists of a cylinder 71 connected to the hub by welding or similar means and a piston 72 reciprocating within the cylinder 71. When it is actuated, the clutch 7 engages the sun gear 43 and carrier 44. Reference numeral 8 designates a friction clutch assembly which is actuated to connect the carrier 44 with a sleeve 9 which in turn is connected with one sprocket 14 in the link arrangement which drives the other output shaft of the transfer apparatus later to be described. A hydraulic power or servo-operated cylinder arrangement is designated by 80, which includes a cylinder 81 welded to the sleeve 9 by way of a rib 91 and a piston 82 reciprocatably mounted within the cylinder 81, the sleeve 9 being rotatably supported inside intermediate and rear transfer cases 19 and 20. Reference numeral 17 designates the other output shaft from the transfer apparatus. A link arrangement 12 includes a sprocket 14 splined to the sleeve 9, a sprocket 15 splined to the output shaft 17 and a chain 16 running between the sprockets 14 and 15. Reference numerals 22 to 29 designate bearings, 30 to 33 designating oil seals, and 34 to 37 designating seal rings.

The transfer apparatus thus arranged, designated by A in FIG. 2, is mounted in the automatic transmission T connected to a vehicle engine E. One output shaft 11 from the transfer apparatus is connected to a rear drive axle shaft C, and the other shaft 17 is connected to a front drive axle shaft B. Under the normal running conditions of the vehicle, the hydraulic control apparatus for the automatic transmission supplies a line pressure to the hydraulic power cylinder 70 which causes the clutch 7 to engage, and also removes fluid pressures from the hydraulic power cylinder 50 and 80 which causes the corresponding brake 5 and clutch 8 to be disengaged, respectively. This operation causes the sun gear 43 and carrier 44 in the planetary gear train 4 to engage each other so that power is transmitted with a direct drive to the rear drive output shaft 11, thus switching to the rear drive running status. When it is desired to change from the rear drive to the four-wheel drive status during the two-wheel driving, the appropriate lever at the driver's seat is operated to act on the hydraulic control valve (not shown) which controls the supply of a fluid line pressure to the hydraulic power cylinder for the transfer apparatus. In this case, the line pressure from the hydraulic control valve is gradually supplied to the hydraulic power cylinder 80 which causes the clutch 8 engage smoothly, thereby allowing the carrier 44 and sleeve 9 to engage with each other. Thus, the engine power is also transmitted to the front axle shaft through the linkage 12, output shaft 17 and propeller axle shaft B. The vehicle is now switched to the four-wheel driving status where the power transmission takes place with a direct drive through the input shaft 2 to both the front and rear output axles 17 and 11. If it is desired that the vehicle provide an increased output torque when it is about to run on an up-slanted road during the four-wheel driving condition, the hydraulic control valve is then actuated so that it can gradually supply a line pressure to the hydraulic power cylinder 50, and can also remove the fluid pressure from the hydraulic power cylinder 70 at the appropriate timings, thus allowing the brake 5 to engage gradually while allowing the clutch 7 to disengage smoothly. This action causes the revolving carrier 44 to be disconnected from the sun gear 43, thus locking the sun gear 43 motionless. The power from the input shaft 2 is reduced to a higher gear ratio through the linkage of the ring gear 41, pinion 42 and carrier 44, from which the power is transmitted to the output shafts 11 and 17. The thus obtained four-wheel drive provides a greater torque output. Table 1 presents the relationships between the engaged or disengaged brake 5 and clutches 7 and 8, and the vehicle running conditions.

TABLE 1

| Friction elements | | 5 | 7 | 8 |
|---|---|---|---|---|
| Two-wheel drive | reduction gear ratio $\lambda = 1$ | x | o | x |
| Four-Wheel drive | reduction gear ratio $\lambda = 1$ | x | o | o |
| Four-Wheel drive | reduction gear ratio $\lambda = 1.5$ | o | x | o |

In the above table, a circle (o) symbol indicates that the appropriate elements are engaged, and a cross (x) sign indicates that the appropriate elements are disengaged. The reduction gear ratio $\lambda$ represents a ratio of the number of teeth of the sun gear 43 to that of the ring gear 41 in the planetary gear train. The ratio $\lambda$ presented in the above table is assumed to have a value of 0.5.

FIG. 3 illustrates the arrangement of another preferred embodiment of the present invention, in which a double pinion is employed in the planetary gear train for providing a wider gearshift range.

A planetary gear set 4 is arranged such that it includes a revolving carrier 41 splined to the rear end of the output shaft 2, a double pinion assembly 42 having an outer pinion 4A and an inner pinion 4B meshed with each other and rotatably supported on the carrier 41, a central or sun gear 43 in mesh with the inner pinion 4B, and a ring gear 44 in mesh with the outer pinion 4A and splined by way of a hub 10 to one 11 of the output shafts from the transfer apparatus. A friction brake 5 is provided for engaging the sun gear 43 with a front transfer case 18 by way of the hub 6. A hydraulic power or servo-operated cylinder assembly, generally designated by 50, is provided for operating the brake 5 and includes a cylinder 18A formed in the front tranfer case 18 and a piston 51 reciprocatably mounted inside the cylinder 18A. A friction clutch 7 is actuated by a hydraulic power or servo-operated cylinder assembly 70 wich includes a cylinder 71 welded to the hub 6 and a piston 72 reciprocatably mounted within the cylinder 71. When it is actuated, the friction clutch 7 causes the sun gear 43 and the ring gear 44 to engage with each other. Another friction clutch 8 is actuated to connect the ring gear 44 with a sleeve 9 which is in turn connected with one sprocket 12 in the link arrangement which drives the other output shaft of the transfer apparatus later to be described. Under the normal running conditions, the hydraulic control apparatus for the automatic transmission provides a line pressure to the hydraulic power cylinder 70 which causes the clutch 7 to engage, and also removes fluid pressures from the hydraulic power cylinders 50 and 80 which cause the corresponding brake 5 and clutch 8 to be disengaged, respectively. This makes the sun gear 43 and ring gear 44 engage with each other in the planetary gear set 4 so that power is transmitted with a direct drive from the input shaft 2 to the rear drive output shaft 11, allowing the vehicle to be driven by the rear wheels. When it is desired to change from the rear drive to the four-wheel drive during the two-wheel driven running condition, the appropriate lever at the driver's seat is operated so that the hydraulic control valve (not shown) which controls the supply of a line pressure to the hydraulic power cylinder for the transfer apparatus can be actuated to gradually supply a fluid pressure to the hydraulic power cylinder 80 which causes the clutch 8 to engage smoothly, allowing the ring gear 44 and sleeve 9 to engage with each other. Thus, the engine power is also imparted to the front axle shaft through the sprocket 12, output shaft 17 and propeller axle shaft B. This causes the four-wheel drive to be achieved, in which the power transmission takes place with a direct drive through the input shaft 2 to both the front and rear output axles 17 and 11. If it is desired that the vehicle provide an increased output torque when it is about to run or an up-slanted road during the four-wheel drive, the hydraulic control valve is then actuated so that it can gradually provide a line pressure to the hydraulic power cylinder 50 and can also remove the fluid pressure from the hydraulic power cylinder 70 at the appropriate timings, thus allowing the brake 5 gradually to engage while allowing the clutch 7 to disengage smoothly. This action causes the ring gear 44 to be disconnected from the sun gear 43, locking the sun gear 43 motionless. The power from the input shaft 2 is reduced to a higher gear ratio through the linkage including the carrier 41, pinion 42 and ring gear 44, from which the power is transmitted to the output shafts 11 and 17. The thus obtained four-wheel drive provides an increased torque output. Table 2 presents the relationships between the engaged or disengaged brake 5, clutches 7 and 8, and the vehicle running conditions under the two-wheel drive or four-wheel drive.

TABLE 2

| Friction elements | | 5 | 7 | 8 |
|---|---|---|---|---|
| Two-wheel drive | reduction gear ratio $\lambda = 1$ | x | o | x |
| Four-wheel drive | reduction gear ratio $\lambda = 1$ | x | o | o |
| Four-wheel drive | reduction gear ratio $\frac{1}{1-\lambda} = 1.82$ | o | x | o |

In the above table, a circle (o) symbol indicates that the appropriate elements are engaged, and a cross (x) sign indicates that the appropriate elements are disengaged. The reduction gear ratio $\lambda$ represents a ratio of the number of teeth of the sun gear 43 to that of the ring gear 41. The ratio $\lambda$ presented in the above table is assumed to have a valve of 0.45.

As noted from the foregoing description, the transfer apparatus according to the present invention includes wet-type friction engaging elements actuated by the corresponding hydraulic power cylinders, and a double-pinion planetary gear set or simple pinion planetary gear set. One advantage of the transfer apparatus is to permit the friction elements to operate with smoothness, and to provide appropriate timing and sequence control functions for operating the different friction elements in the controlled operation sequence. The resulting advantage is to make it possible to change from the two-wheel drive to four-wheel drive and vice versa when the vehicle is running. The transfer apparatus has the capabilities of gear shifting therein, and provides gearshifts through a wide gearshift ratio range by the use of the double pinion planetary gear set.

Although the present invention has been described by way of the several preferred embodiments thereof, it should be understood that various changes and modifications may be made without departing from the spirit and scope of the invention.

What is claimed is:

1. A torque transfer device for a four wheel drive vehicle having front and rear axles, comprising:
   a stationary housing;
   an input shaft receiving torque from a gear transmission;
   a first output shaft rotatably coupled with either one of said front and rear axles;
   a second output shaft rotatably coupled with the other one of said axles;
   A planetary gear set including a sun gear, a ring gear, a planetary pinion carrier, and a planetary pinion gear means rotatable about axes fixed to said carrier, said pinion gear means being engaged with at least one of said ring gear and sun gear;
   a friction brake means including friction elements positioned on said housing for selectively engaging said friction elements to stop one of said sun gear, ring gear, and planetary pinion carrier against said housing;
   a first friction clutch means including friction elements, an annular hydraulic cylinder and a piston axially movable within said cylinder for engaging and disengaging said friction elements and adapted to engage selectively only two of said sun gear, ring gear, and planetary pinion carrier;
   a second friction clutch means including friction elements, a hydraulic cylinder connected to said second output shaft, and a piston slidably fitted in said cylinder for engaging and disengaging said friction elements and adapted to act between said first output shaft and second output shaft for selectively engaging said first output shaft and second output shaft with each other, provided that said friction brake means, first friction clutch means and second friction clutch means are arranged to operate independently of each other;
   wherein a low gear ratio drive mode is established when said friction brake means is engaged and said first friction clutch means is disengaged,
   direct coupling drive mode is established when said friction brake means is disengaged and said first friction clutch means is engaged, and
   four wheel drive mode is established when said second friction clutch means is engaged.

2. A torque transfer device as claimed in claim 1 wherein said first output shaft is coaxial with said input shaft.

* * * * *